Patented Nov. 13, 1945

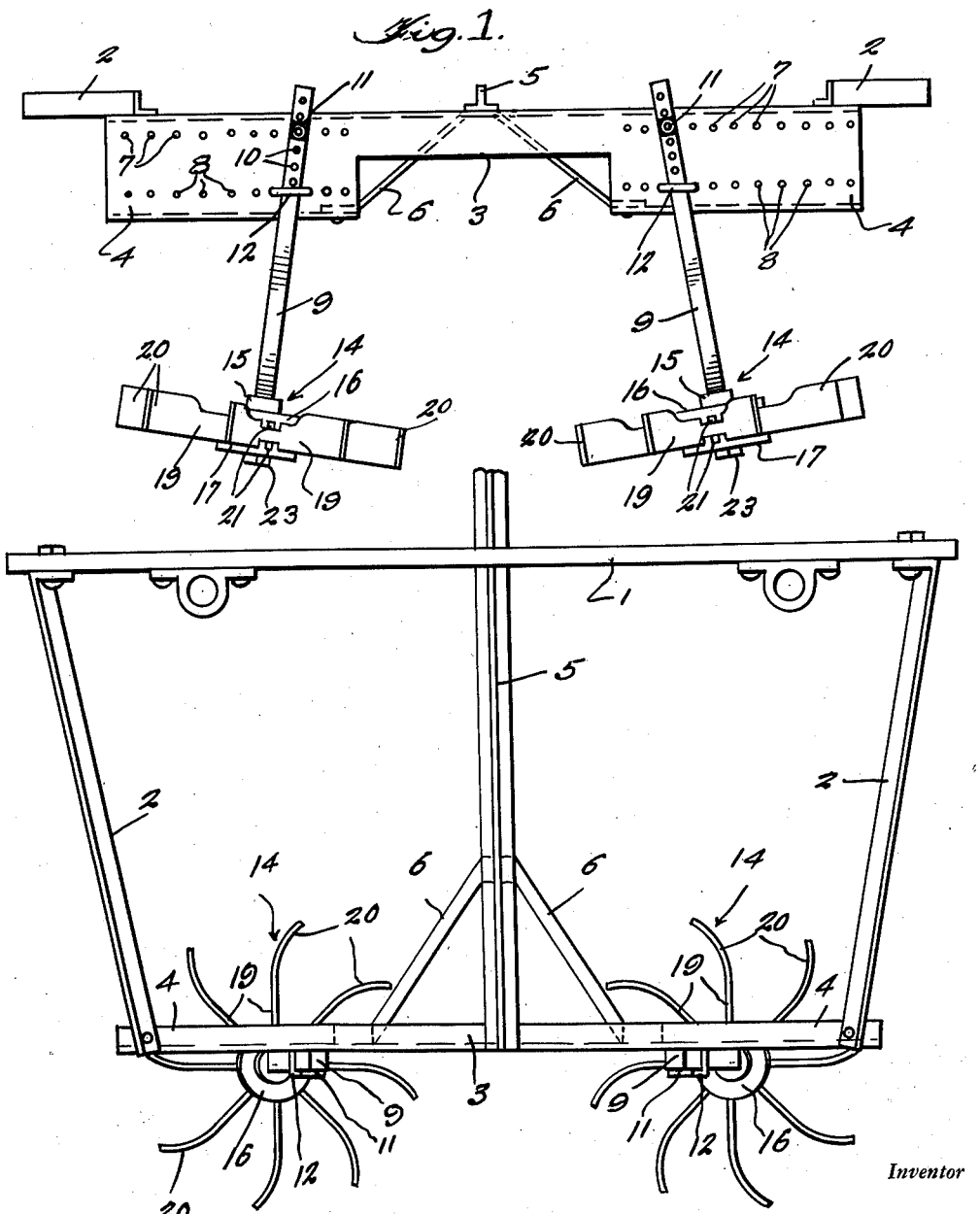

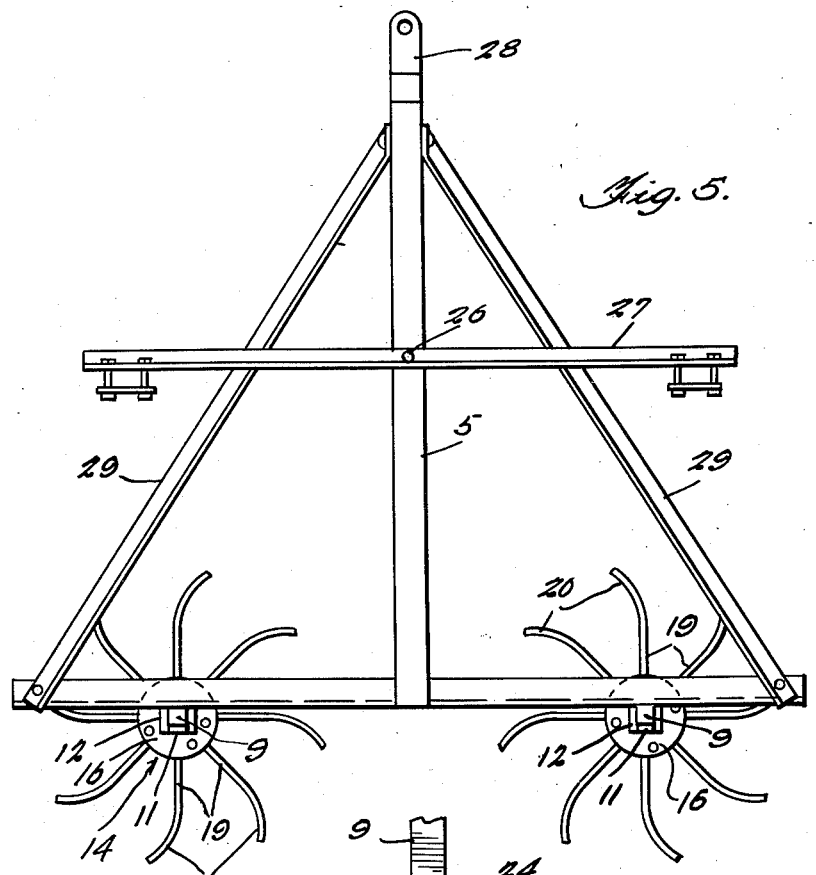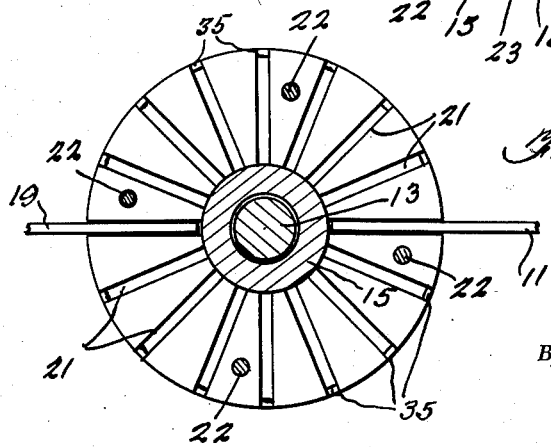

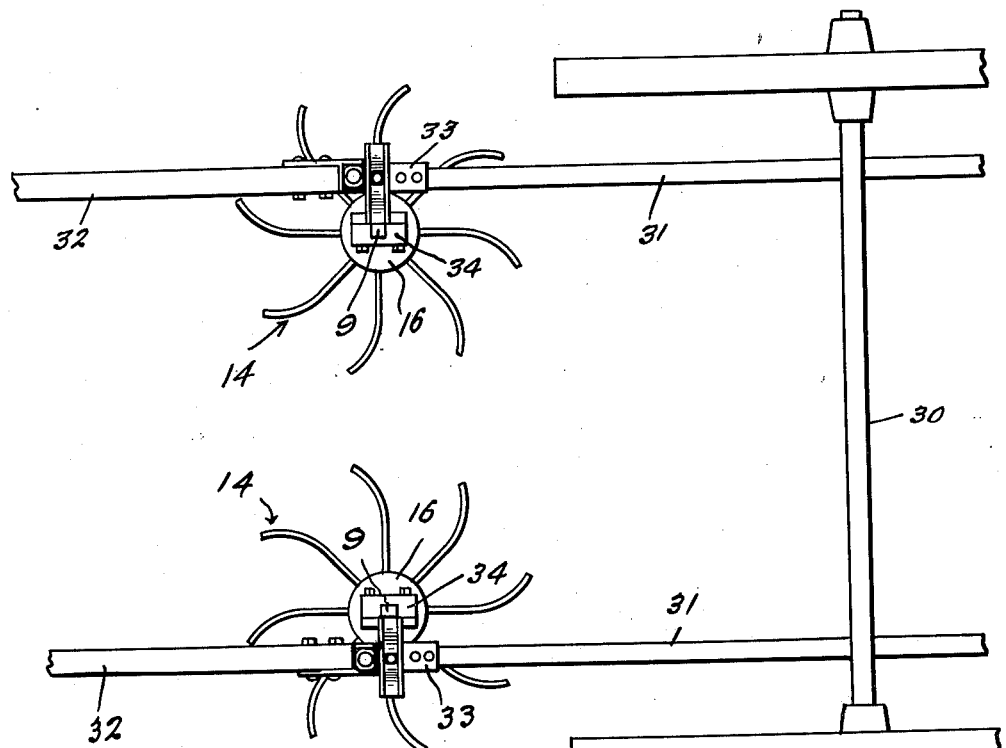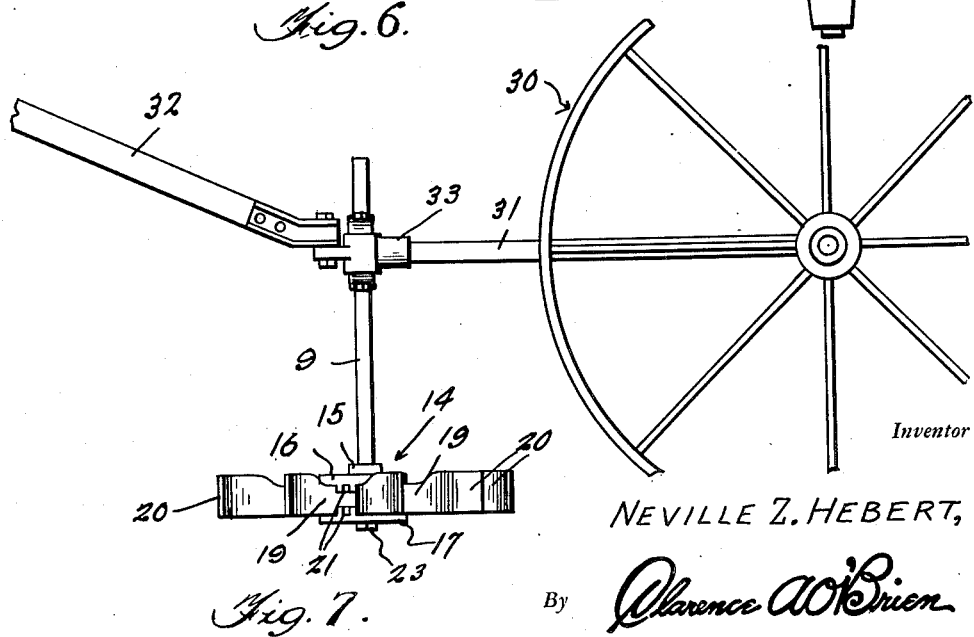

2,388,689

UNITED STATES PATENT OFFICE 2,388,689

AGRICULTURAL DEVICE

Neville Z. Hebert, Jeanerette, La.

Application May 8, 1941, Serial No. 392,553

1 Claim. (Cl. 97—179)

The present invention relates to new and useful improvements in agricultural devices and has for one of its important objects to provide, in a manner as hereinafter set forth, a device of this character comprising a plurality of rotary hoes which are adapted to be expeditiously mounted for operation on a tractor, various types of cultivators and other agricultural implements or machines.

Another very important object of the invention is to provide an agricultural device of the aforementioned character wherein the rotary hoes may be conveniently adjusted as desired to meet various conditions.

Other objects of the invention are to provide an agricultural device of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in rear elevation of the embodiment of the invention which is to be mounted on a tractor.

Figure 2 is a top plan view thereof.

Figure 3 is a view in vertical section through one of the rotary hoes.

Figure 4 is a view in horizontal section, taken substantially on the line 4—4 of Figure 3.

Figure 5 is a top plan view of the device adapted for a riding cultivator.

Figure 6 is a top plan view, showing the invention installed on a walking cultivator.

Figure 7 is a view in side elevation of the walking cultivator arrangement.

Referring now to the drawings in detail, and to Figures 1 to 4, inclusive, thereof in particular, it will be seen that reference numeral 1 designates the usual cultivator disk supporting bar to be secured transversely in a conventional manner on the rear end of a tractor.

Mounted on the end portions of the bar 1 and extending rearwardly and inwardly therefrom is a pair of angle iron arms 2. Mounted on the rear end portions of the arms 2 is a transverse bar 3 of suitable metal.

The bar 3 includes enlarged, depending end portions 4. Extending forwardly from an intermediate portion of the bar 3 is a tongue 5 for connection with the tractor. Braces 6 extend from the tongue 5 to the lower portions of the enlarged end portions 4 of the bar 3.

The end portions 4 of the bar 3 have formed therein upper and lower series of spaced openings 7 and 8, respectively. Mounted on the end portions 4 of the bar 3 and depending therefrom are metallic shanks 9 which are square in cross section. The upper end portions of the shanks 9 have formed therein spaced openings 10 in which bolts 11 are selectively insertable, said bolts 11 also being selectively insertable in the openings 7. The shanks 9 are further secured in position through the medium of U-bolts 12 which are selectively engageable in the openings 8 in the bar 3. It will thus be seen that the shanks 9 are mounted for vertical, lateral and swinging adjustment on the bar 3.

At their lower ends, the shanks 9 terminate in reduced spindles 13. Mounted on the spindles 13 are rotary hoes 14. The hoes 14 include hubs 15 which are journaled on the spindles 13. Formed integrally with the hubs 15 are flanges 16. Mounted on the lower end portions of the hubs 15 are metallic disks 17 having sockets 18 therein for the reception of said hubs.

Blades 19 are mounted between the flanges 16 and the disks 17, the inner ends of said blades abutting the hubs 15. The blades 19 radiate from the hub assembly and terminate in curved outer end portions 20. The opposed faces of the flanges 16 and the the disks 17 have formed therein radial grooves or channels 21 which receive the inner end portions of the blades 19. As many of the blades 19 as desired may be used. These blades are firmly clamped between the flanges 16 and the disks 17 through the medium of bolts 22. Nuts 23 are threaded on the lower end portions of the spindles 13 for securing the hub assemblies thereon. Suitable fittings 24 are provided on the hubs 15 for lubricating the spindles 13.

It is believed that the manner in which the implement or device function will be readily apparent from a consideration of the foregoing. Briefly, as the tractor moves over the ground it straddles the row. Thus, the rotary hoes 14 travel adjacent opposite sides of the row and the blades 19 thereof are caused to enter the row from the opposite sides. Contact by the blades 19 with the ground as the machine travels in a forward direction causes the hoes 14 to rotate in opposite directions. Through the medium of the elements 11 and 12 the rotary hoes 14 may be expeditiously adjusted. For example, the shanks 9 may be adjusted vertically by inserting the bolts 11 in the desired openings 10. Swinging adjustment of the shanks 9 for causing the rotary hoes 14 to function at any desired inclination, as suggested in Figure 1 of the drawings, may be conveniently accomplished by inserting the U-bolts 12 in the desired openings 8. Then, the rotary hoes may be adjusted for width by engaging the elements 11 and 12 in the desired openings 7 and 8, respectively. Ribs or lugs 35 in the grooves 21 engage in notches provided therefor in the blades 19 for positively anchoring said blades in the hubs 14.

Figure 5 of the drawings illustrates the invention adapted for mounting on a riding cultivator. In this embodiment of the invention the tongue 5 is secured at an intermediate point, as at 26, to the usual tool bar 27 of the cultivator. The tongue 5 terminates in an upwardly offset, apertured forward end portion 28 for connection with the cultivator. Braces 29 extend from the end portions of the bar 3 to the forward portion of the tongue 5. In other respects the construction and operation of this embodiment of the invention is substantially similar to that illustrated in Figures 1 to 4, inclusive, of the drawings.

Referring now to Figures 6 and 7 of the drawings, it will be seen that reference numeral 30 designates generally a portion of a walking cultivator comprising longitudinal bars 31 having handles 32 secured to their rear ends by couplings 33. Clamps 34 are provided on the inner sides of the couplings 33 for adjustably securing the shanks 9 thereto. In the operation of this embodiment the hoes 14 also enter the row from the opposite sides thereof and are caused to rotate in opposite directions as the implement 30 moves forwardly.

It is believed that the many advantages of an agricultural device constructed in accordance with the present invention will be readily understood and although preferred embodiments are as illustrated and described, it is to be understood that further modifications and changes in the details of construction may be resorted to which will fall within the scope of the invention as claimed.

What is claimed is:

An agricultural device comprising a horizontal bar for mounting transversely on an agricultural implement, said bar having horizontal series of upper and lower openings therein, shanks of square cross section in face-abutting engagement with the bar and depending therefrom, said shanks having vertical series of openings therein, bolts engageable selectively in the upper openings in the bar and in the last-named openings for securing said shanks to said bar for lateral shifting, pivotal and vertical adjustment, U-bolts engaged with the shanks and insertible selectively in the lower series of openings for securing said shanks in pivotally adjusted position, and rotary hoes journaled on the lower end portions of the shanks.

NEVILLE Z. HEBERT.